United States Patent [19]

Lechleider

[11] Patent Number: 5,410,264

[45] Date of Patent: Apr. 25, 1995

[54] ADAPTIVE IMPULSE NOISE CANCELER FOR DIGITAL SUBSCRIBER LINES

[75] Inventor: Joseph W. Lechleider, Morristown, N.J.

[73] Assignee: Bell Communications Research, Inc., Livingston, N.J.

[21] Appl. No.: 959,890

[22] Filed: Oct. 13, 1992

[51] Int. Cl.$^6$ ............................................. H04B 15/00
[52] U.S. Cl. ...................................... 327/311; 327/551
[58] Field of Search ............... 328/162, 163, 165, 167; 307/520, 521

[56] References Cited

U.S. PATENT DOCUMENTS

| | | | |
|---|---|---|---|
| 3,374,435 | 3/1968 | Engel ................................... | 328/162 |
| 3,825,843 | 7/1974 | Felsberg et al. ..................... | 328/163 |
| 4,587,620 | 5/1986 | Niimi et al. .......................... | 328/163 |
| 4,914,398 | 4/1990 | Jove et al. ............................ | 328/162 |

OTHER PUBLICATIONS

"Impulse Noise in the Loop Plant", J. J. Werner, 1990 IEEE, pp. 1734–1737. (month unknown).
"The HDSL Environment", J. J. Werner, IEEE Journal on Selected Areas in Communications, vol. 9, No. 6, Aug. 1991, pp. 794,795,800.

Primary Examiner—Andrew M. Dolinar
Attorney, Agent, or Firm—Leonard Charles Suchyta; James W. Falk

[57] ABSTRACT

An impulse noise canceler includes circuitry which recognizes, locates, and cancels impulse noise when it occurs in an incoming signal. Impulse noise is characterized by a shape, an amplitude, and an arrival time, any or all of which may be unknown. In one implementation, adaptive circuitry is deployed to estimate the amplitude when it is the only unknown, and a replica of the impulse noise is generated and used to cancel the impulse noise in the incoming signal. In another implementation, both the arrival time and amplitude are estimated when they are unknowns, and a replica is again generated to cancel the original impulse noise. In yet another implementation, the shape, amplitude, and arrival time are all estimated of the impulse noise to produce the replica to cancel the original impulse noise.

11 Claims, 8 Drawing Sheets

ADAPTIVE IMPULSE NOISE CANCELER FOR DIGITAL SUBSCRIBER LINES

FIELD OF THE INVENTION

The invention relates generally to digital systems and, more specifically, to the cancellation of impulse noise in digital subscriber transmission lines.

BACKGROUND OF THE INVENTION

A Digital Subscriber Line (DSL) is a technology that effects digital communication to customers over an existing line, typically a twisted-pair in a wire cable comprising the telephone loop plant. The current loop plant environment, including bridged taps and mixed metallic wire gauges, was originally designed for voice frequency transmission. Now, however, this loop plant presents a complex environment for wideband transmission such as digital data services. In order to economically provide wideband services, the DSL must be implemented without conditioning the loop plant (e.g., by removing bridged taps or by rearranging pairs), notwithstanding the detrimental effects of bridged taps and gauge changes. Furthermore, no special engineering or operations can be associated with DSL installation.

"Impulse noise" is one of the most difficult transmission impairments to suppress in a DSL environment. Impulse noise is noise that appears on the line during short intervals that are random in their occurrence. Impulse noise has many causes and there are no universally accepted explanations for its appearance or models of it. There are many suspected causes for impulse noise, such as:

(1) Longitudinal transients that result from relay closures at central office terminations. The longitudinal transients easily couple between pairs and then between the longitudinal and metallic circuits of a given pair because of imbalance to ground in the pair.

(2) Telephone sets going off-and-on hook at the station end. The coupling mechanism is substantially the same as in the case of relay closures.

(3) Powerful electrical equipment, which is connected to a power line that runs along a telephone cable, switching on-and-off. Again, coupling is initially between longitudinal circuits and then through longitudinal-metallic imbalance in the disturbed pair.

(4) Poorly grounded equipment that is attached to the telephone network on leased and private lines. Coupling is directly between metallic circuit and longitudinal circuit of the disturbing pair.

(5) Craft activity in the repairing and/or rearranging of telephone cables.

(6) Lightning.

There have been many surveys of impulse noise, but almost all of these have studied impulse noise that was confined to the low tens of kilohertz. The classic approach to combating low-frequency impulse noise was to provide a signal powerful enough to render impulse noise relatively inconsequential. This often proved futile because impulse noise has such high energy density for short intervals.

More recently, with the advent of Integrated Digital Services Network (ISDN), High Rate Digital Subscriber Line (HDSL), and Asymmetrical Digital Subscriber Line (ADSL), there has been interest in impulse noise at higher frequencies. With wider-band impulse noise, research and concomitant field measurements have focused on the shape and spectra of the impulses. As a result of what has been generally learned, error correcting codes have been introduced to overcome some of the deleterious properties of impulse noise in high-frequency communication systems. Those important properties of impulse noise at high frequencies, in contrast to its causes, include:

(a) an impulse may have much greater energy than the signal segment that it is impressed upon;

(b) the time of arrival of an impulse is unpredictable—even the probability distribution of interarrival times is uncertain;

(c) because of the impulsive nature of the noise, time-invariant filtering does not work especially well;

(d) the shapes of the impulses tend to be quite varied and relatively little is known about impulse shapes; and (e) the characteristics of impulses change from location to location and they are evolving as equipment both connected to and influencing the telephone network evolves.

These characteristics certainly make impulse noise a formidable impairment. However, recent data from a field study of impulse noise indicates that most impulses on a given pair have approximately the same shape. It is certainly reasonable to believe that any impulse on a given line could have one of a relatively small number of shapes. Presumably, the causes of impulses on a given line are largely recurring events—for example, from above, closure of a line relay on an adjacent cable pair.

If there are only a few impulse shapes on a given pair, then adaptive pattern recognition techniques might be used to determine the shapes of the impulses and then the knowledge of the shapes used to cancel the impulses when they occur. One of the problems with this is deciding exactly when an impulse occurred and deciding which of the shapes has occurred.

But presently there is no teaching in the art whereby impulse noise can be recognized, located and canceled as the impulses occur.

SUMMARY OF THE INVENTION

These limitations and other deficiencies of the prior art are obviated, in accordance with the present invention, by circuitry which recognizes, locates, and cancels impulses when they occur.

Broadly, in one aspect of the present invention, an adaptive impulse noise canceler processes an incoming signal corrupted by impulse noise wherein the impulse noise has a known shape and known arrival time but unknown magnitude. In this realization, a replica of the impulse shape weighted by an estimate to the magnitude is derived, and then this replica is subtracted from the incoming signal to cancel the impulse noise.

In another aspect of the present invention, the canceler processes an incoming signal corrupted by impulse noise now having a known shape but unknown magnitude and unknown arrival time. A replica of the impulse shape, weighted by an estimate to the magnitude and generated at a time corresponding to an estimate to the arrival time, is used to offset the incoming signal to thereby substantially cancel the impulse noise present in the incoming signal.

In yet another aspect of the present invention, the canceler processes an incoming signal corrupted by impulse noise wherein the shape, magnitude, and arrival time are all unknowns. The unknown impulse noise shape is generated using adaptive circuitry, and estimates to both the magnitude and arrival time are effected. A replica of the impulse noise is derived and is then subtracted from the incoming signal to effectively cancel the impulse noise.

The organization and operation of the invention will be better understood from a consideration of the detailed description of the illustrative embodiments thereof, which follow, when taken in conjunction with the accompanying drawing.

DETAILED DESCRIPTION

In order to provide a context for understanding the most general aspects of the present invention, a number of impulse noise canceler implementations are discussed; each of the implementations is progressively more complex than prior implementations as a result of introducing more unknown parameters for consideration. Moreover, each succeeding implementation in the series builds upon the principles elucidated in the prior implementations. This approach has the advantage of introducing notation and terminology on an incremental basis which then facilitates understanding the broadest aspects of the present invention.

AN IMPULSE CANCELER FOR PULSES OF KNOWN SHAPE, MAGNITUDE AND ARRIVAL TIME

Figure 1:
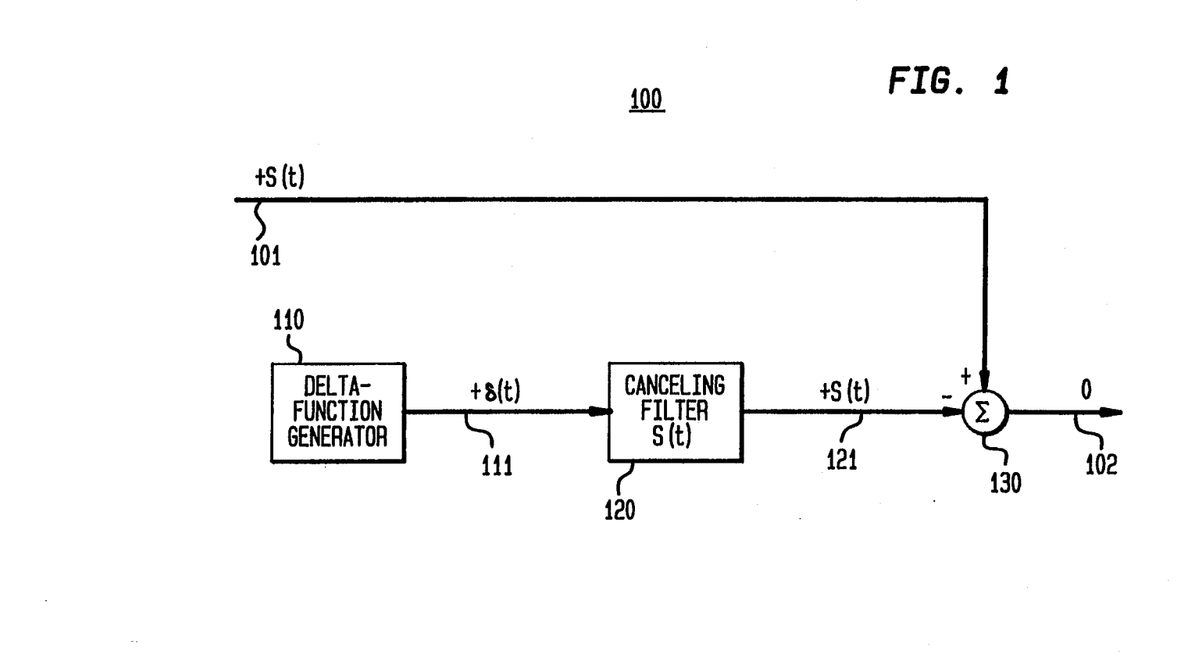
FIG. 1 depicts, in block diagram form, simplified circuitry for canceling impulse noise given the shape, magnitude, and arrival time of the impulse noise.

Impulse noise canceler 100 of FIG. 1 is an arrangement for canceling impulse noise signal S(t) arriving on line 101. The shape, amplitude and arrival time of impulse S(t) are presumed to be known beforehand. For sake of simplicity but not without loss of generality, it is assumed that the amplitude of the impulse noise is unity and arrives at t=0 (i.e., if a general representation for the impulse noise appearing on line 101 is $kS(t-\tau)$, then k=1 and $\tau=0$). Delta-function generator 110 produces a delta-function, designated $\delta(t)$, at time t=0 on lead 111, and this signal is delivered to canceling filter 120.

Filter 120 is configured to have an impulse response characteristic of S(t), that is, the response of filter 120 to a delta-function at its input is S(t), and this response appears on lead 121. Subtractor 130 receives both the signal on lead 101 and the signal on lead 121 and produces the difference between these two signals. Since each lead delivers S(t), then the output on lead 102 is zero over all time for this ideal case.

AN IMPULSE CANCELER FOR PULSES OF KNOWN SHAPE AND ARRIVAL TIME BUT UNKNOWN AMPLITUDE

Figure 2:
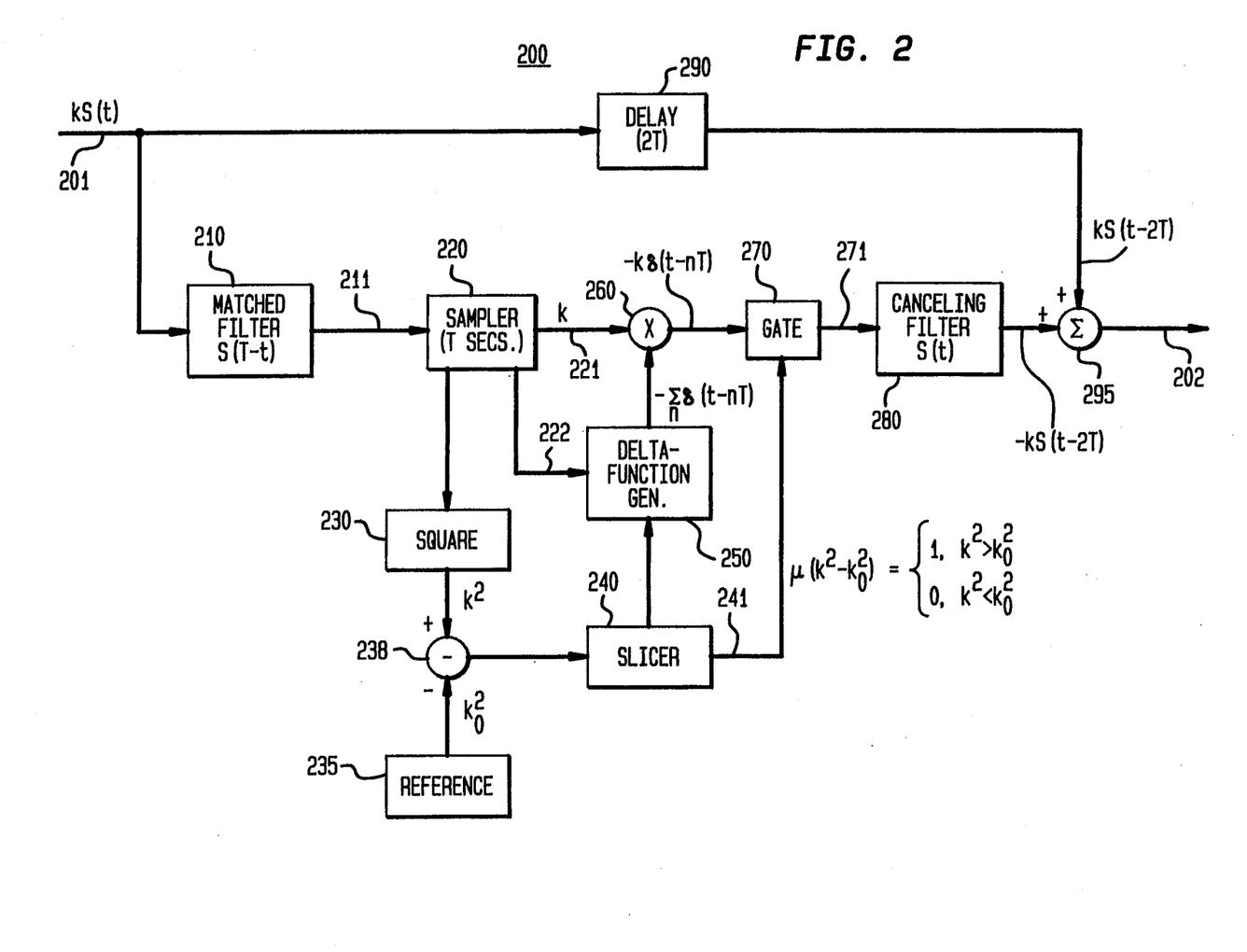
FIG. 2 depicts, in block diagram form, circuitry for canceling impulse noise given that the shape and arrival time are known, but the magnitude is not known.

An impulse canceler that cancels an impulse noise of a given shape and arrival time but unknown amplitude is effected by circuit arrangement 200 illustrated in FIG. 2. In FIG. 2, a noise impulse expressed as kS(t) serves as the input to canceler 200. S(t) is presumed to be of duration T seconds and is normalized, $$\left( \text{i.e., } \int_0^T S(t)^2 dt = 1 \right).$$

This incoming impulse kS(t) is split between two paths in canceler 200. In the upper path, the incoming impulse noise arriving on lead 201 is delayed by 2T seconds to compensate for the delay introduced by the processing of the lower path. In the lower path, the incoming pulse on lead 201 serves as the input to matched filter 210, which has an impulse response expressed by S(T−t), that is, filter 210 is matched to the normalized impulse noise shape so that its output after T seconds is maximal with an output value equal to the amplitude k of the arriving pulse. The output of filter 210, appearing on lead 211, is the input to sampler 220; the sample interval of sampler 220 is T seconds. Sampler 220 includes synchronization circuitry which synchronizes sampler 220 with the known arrival time of impulse noise kS(t). Because filter 210 is matched to S(t), the output of sampler 220 at time T is k; this amplitude value appears on lead 221.

Delta-function generator 250, which is responsive to sampler 220 via lead 222, generates a negative-going delta-function every T seconds (i.e., n=1,2,3, ... ) and the output of generator 250 serves as one input to multiplier 260. The other input to multiplier 260 is provided by the output of sampler 220. Multiplier 260 causes the delta-function appearing at 2 T seconds to be weighted by amplitude k. The weighted delta-function, which is the output of multiplier 260, serves as one input to gate 270. The other input to gate 270 is provided by slicer 240. To determine the output delivered by slicer 240, the combined operation of elements 230, 235, and 238 is now explained. The purpose of the combination of elements 230, 235, and 238 is to guarantee that the impulse that is being canceled is truly an impulse and not a signal or another variety of noise; this combination of elements is referred to as a level detector.

Square-law device 230 squares the sample value from sampler 220, which is the amplitude k at time T seconds. Reference generator 235 produces a predetermined reference amplitude designated $k_0^2$. The slicing level, $k_0^2$, is set at a level to prevent accidental triggering of the canceler by crosstalk, signals, etc. Subtractor 238 subtracts the reference signal from the square of the amplitude signal, that is, the input to slicer 240 is $K^2 - K_0^2$. Slicer 240 then performs the electronic operation of passing only those impulses that cross a predetermined threshold; the output of slicer 240, appearing on lead 241, may be expressed mathematically as $\mu(k^2-k_0^2)=1$, for $k^2>k_0^2$, and is zero otherwise. Thus, gate 270 passes impulse noise signals that exceed the predetermined threshold or reference signal.

In effect, as an alternative mathematical expression, the level detector is activated whenever the magnitude of the sampled output from sampler 220 exceeds the magnitude of the reference signal provided by reference source 235.

The amplitude modulated impulse from multiplier 260, when passed through gate 270, drives canceling filter 280. Filter 280 has an impulse response of S(t), so the output of filter 280 is $-kS(t-2T)$ for an input signal of $-k\delta(t-2T)$ whenever $k^2>k_0^2$. Both the outputs of delay circuit 290 and canceling filter 280 serve as inputs to summer 295. Since one input is the negative of the other, the output of summer 295, which appears on lead 202, is zero for this case of a single pulse of known shape and arrival time, but unknown amplitude. Circuitry 200 could also cancel a series of impulse noise signals having a known shape but unknown amplitude arriving at most every 2 T seconds.

AN ADAPTIVE CANCELER FOR PULSES OF KNOWN SHAPE BUT UNKNOWN AMPLITUDE AND ARRIVAL TIME

Figure 3:
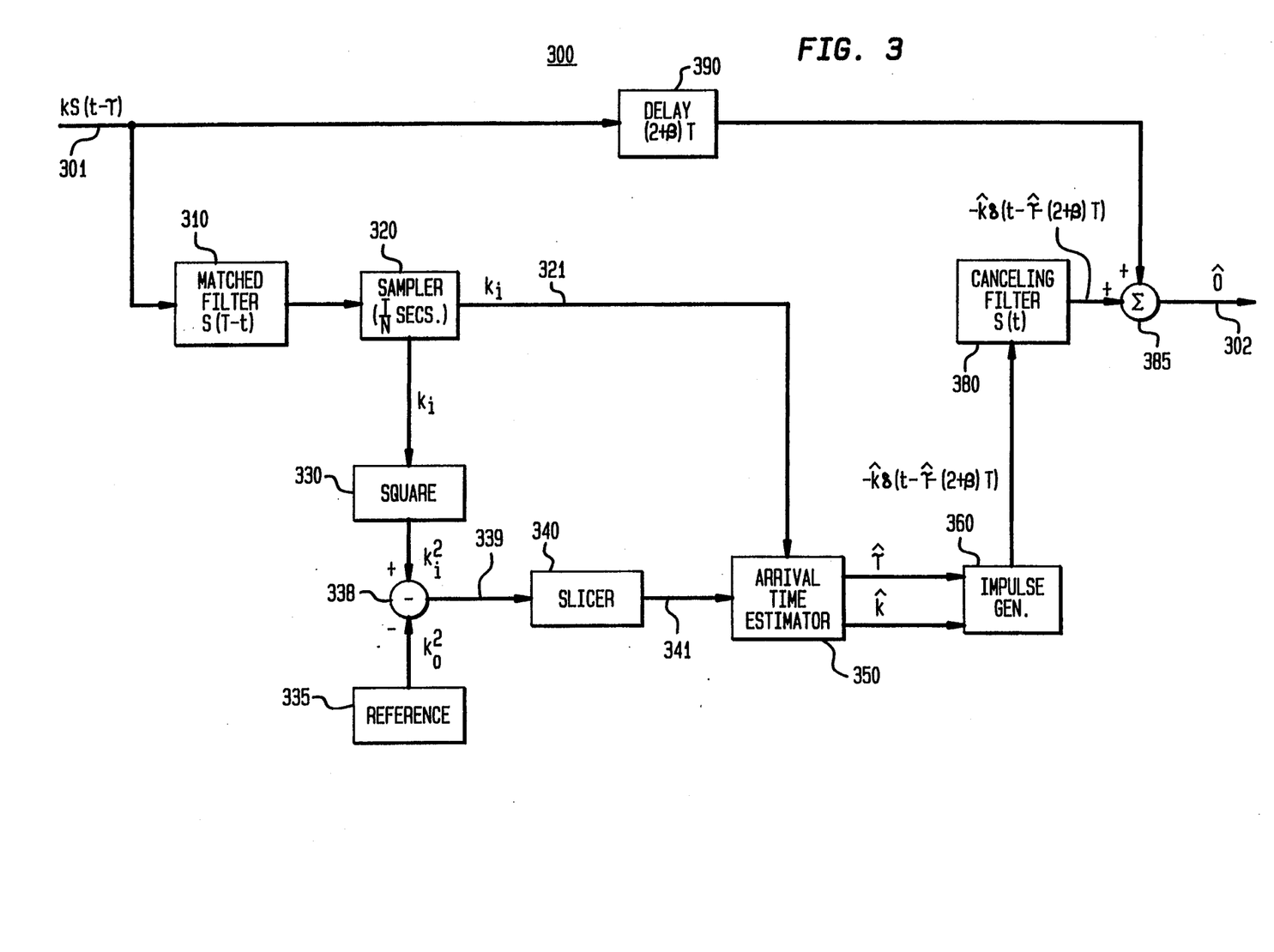
FIG. 3 depicts, in block diagram form, circuitry for canceling impulse noise given that the shape is known, but the magnitude and arrival time are unknown.

An impulse canceler that cancels an impulse $kS(t-\tau)$ of given shape S(t) but unknown amplitude k and unknown arrival time $\tau$ is effected by circuitry 300 as depicted in FIG. 3. Again, S(t) is assumed to be of duration T and is normalized to unity. The incoming pulse appearing on lead 301 is split between two paths in canceler 300. In the upper path, the incoming impulse noise is delayed by $(2+\beta)T$ seconds, where $\beta \geq 1$, so as to compensate for the processing delay in the lower path.

In the lower path, the incoming pulse on lead 301 serves as the input to matched filter 310, which has an impulse response expressed by $S(T-t)$. The output of filter 310 is the input to sampler 320; now the sample rate is T/N seconds (as contrasted to T seconds for circuitry 200 of FIG. 2), where N is an integer greater than one. Sampler 320 does not require synchronization circuitry since the arrival times of the pulses are unknowns. The purpose of sampling at a higher rate is to provide an accurate estimate to arrival time $\tau$. Generally, N is at least ten so that at least ten estimates are effected during the time interval (0,T). The sampled values produced by sampler 320 are denoted $k_i$. A sequence of these sample values appears as an input to square law device 330. The output of squarer 330 is a sequence of values denoted $k_i^2$, and this sequence of values serves as one input to subtractor 338. Also, reference generator 335 generates a predetermined reference level $k_0^2$ and provides this level as another input to subtractor 338. The output of subtractor 338, which appears on lead 339, is expressed as $k_i^2-k_0^2$ for each $i=1,2,\ldots$. Slicer 340 then produces a sequence of 1's and 0's, depending on the value of $k_i$ at the $i^{th}$ sample point. The combination of elements 330, 335, 338 and 340 detect the presence of impulse noise before the noise has completely passed through match filter 310, thereby establishing that the energy that has started passing through matched filter 310 during the past T seconds is sufficient to assert that an impulse has arrived, but not with a precise estimate of the arrival time $\tau$. Accordingly, the reason for sampling the output of matched filter 310 at the higher rate T/N is so that a more accurate estimate may be made of the time of arrival, as now discussed.

Arrival time estimator 350 detects when the output of the matched filter is extremal shortly after the presence of a pulse has been detected. This is the reason that the delay in the upper path is greater than T—the decision about the precise arrival time cannot be made until shortly after the arrived impulse has completely passed through matched filter 310. In order to determine when the output of matched filter 310 is globally extreme at a given instant, arrival time estimator 350 maintains a recent history of the sampled output of matched filter 310, that is, the $k_i$'s delivered by sampler 320 on lead 321.

Figure 4:
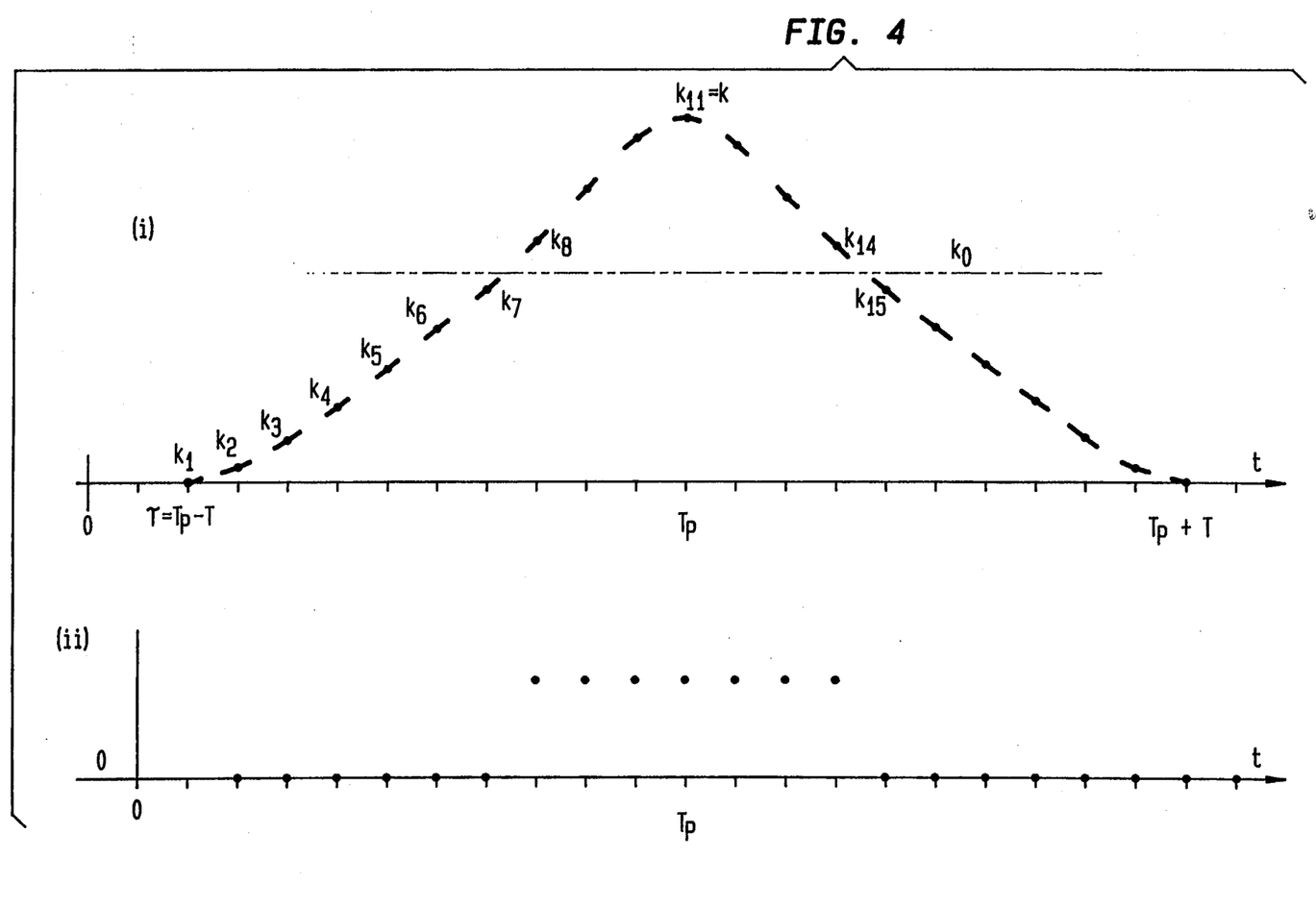
FIG. 4 depicts exemplary outputs of the sampler and the slicer of FIG. 3, which serve as inputs to the arrival time estimator, as well as a pictorial representation for determining the arrival time from the sampler and slicer outputs.

To explain the interaction between slicer 340 and estimator 350, as well as the processing that is effected by estimator 350, reference is made to FIG. 4. Line (i) of FIG. 4 illustrates pictorially, as a dashed curve, the continuous time output of matched filter 310 as a function of time for an arbitrary but known input noise shape S(t). The output of matched filter 310 is, in signal theoretic terms, the correlation function f(t) of the exemplary input shape S(t), i.e., $$f(t) = \int_0^T S(r)S(r-t)dr.$$

The correlation function has a peak at time $T_p$, with the peak having a value k, and the correlation function covers the time interval from $\tau=T_p-T$ to $T_p+T$, where $\tau$ is the unknown arrival time. Samples $k_i$ of the correlation function are taken by sampler 320 every T/N seconds; such samples are shown in FIG. 4 for N=10. The maximum value occurs at $T_p$, where $k_{11}=k$. Also shown on line (i) is an exemplary threshold value $k_0$.

With reference to line (ii) of FIG. 4, there is shown the "1" or "0" output of slicer 340. Threshold $k_0$ is exceeded between sample values $k_7$ and $k_8$ on the leading portion of the correlation curve, and between $k_{14}$ and $k_{15}$ on the trailing portion, so the slicer output is unity for samples $k_8-k_{14}$. Arrival time estimator 340 detects the 0—to −1 transition in the output of slicer 340 and initiates its estimation activity. The $k_i$ samples above the threshold (i=8, 9, 10, 11, 12, 13, 14) are stored for comparison to determine the sample with the largest value —in this case, sample $k_{11}$. The time of occurrence of the largest sample value, namely, $T_p$ is registered, and concomitantly, the unknown arrival time $\tau$ may then be determined by $\tau=T_p-T$.

It is to be noted that the example of FIG. 4 is ideal in the sense that the peak of the correlation curve occurs at a sample instant. If this were not the case, then only estimates to both the magnitude k and the arrival time $\tau$ are effected—such estimates are denoted $\hat{K}$ and $\hat{\tau}$, respectively. It is possible to converge to the actual values with the estimated values by increasing the sampling rate N.

Figure 5:
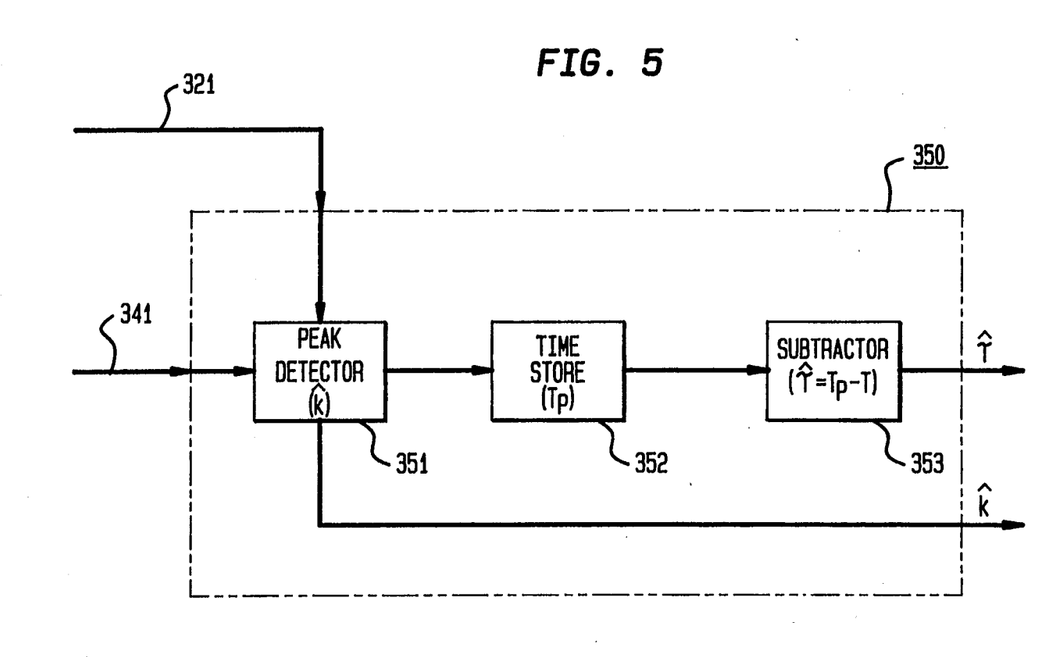
FIG. 5 is an illustrative embodiment for the arrival time estimator of FIG. 3.

An illustrative embodiment for arrival time estimator 350 is depicted in FIG. 5. The inputs from sampler 320 and slicer 340, on leads 321 and 341, respectively, serve as inputs to peak detector 351. As discussed above with reference to FIG. 4, peak detector 351 locates the sample with the largest value in the sampled correlation function, namely, $\hat{k}$. Time store 352 determines and stores the time of occurrence of the peak sample, namely, $T_p$. Subtractor 353 computes the difference $\hat{T} = T_p - T$.

Arrival time estimator 350 delivers estimates $\hat{K}$ and $\hat{\tau}$ to impulse generator 360, which then produces a negative going impulse of weight $\hat{k}$ at time $\hat{\tau} + (2+\beta)T$. The output of generator 360 serves as the input of canceling filter 380, which has S(t) as its impulse response. Both the output of delay device 390 and canceling filter 380 serve as inputs to summer 385. The output of summer 385, on lead 302, is nominally zero, denoted $\hat{0}$.

The output of canceler 300 is written as $\hat{0}$ to emphasize the fact that both the noise pulse arrival time and the impulse magnitude are estimated, thereby leading only to approximate, rather than exact, cancellation. The errors in these estimates could also be influenced by the presence of noise and communications signals that are extraneous to the cancellation process.

Figure 6:
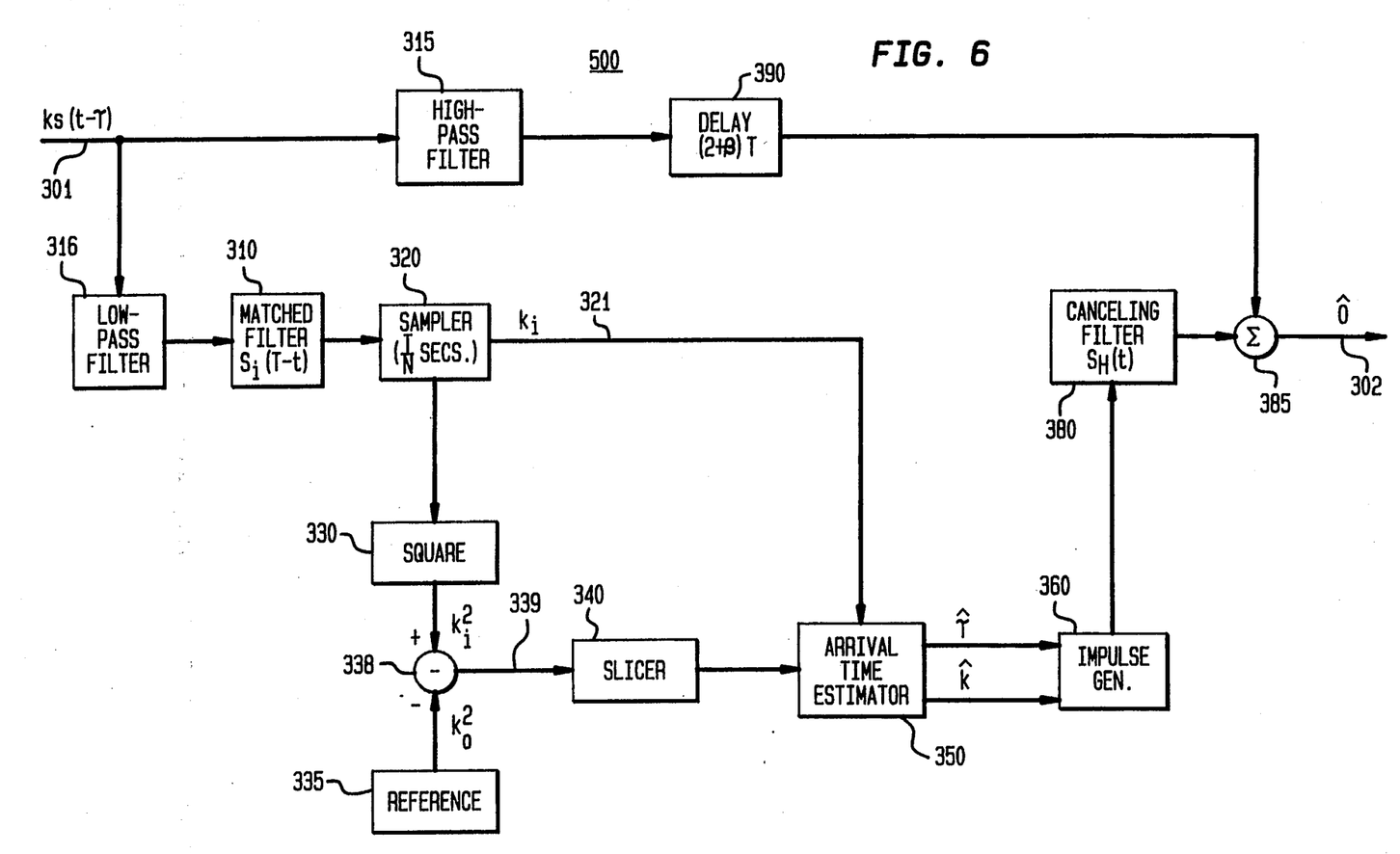
FIG. 6 depicts, in block diagram form, the counterpart to FIG. 3 for the case of band-limited communication signals.

In certain applications of the cancellation procedure, especially to bandpass transmission systems, communications signals can be effectively suppressed by filtering. This is true when most of the of the signal energy is in the pass-band, while the energy in most impulses is outside of the pass-band. With reference to FIG. 6, filtering can be effected by adding high pass filter 315 to the upper branch of circuitry 300 of FIG. 3, and low pass filter 316 to the lower branch before matched filter 310. Now method filter 310 must be matched to the output of low-pass filter 316 (designated $S_L(t)$), and canceling impulse shaping filter 380 cancels the shape of the output of high-pass filter 315 (designated $S_H(t)$). Otherwise, the arrangement and operation of FIG. 6 is the same as in FIG. 3.

CANCELLATION OF IMPULSE NOISE WITH A SINGLE UNKNOWN PULSE SHAPE

The impulse noise canceler of FIGS. 2, 3 and 6 work well only if the shape of the impulse to be canceled is known. To handle an impulse of unknown shape, amplitude, and arrival time, a zero-forcing adaption algorithm is introduced to the arrangement and procedure. Adaptation to approximate pulse shapes could follow standard adaption procedures if the amplitude and arrival time were known, but a generalized adaption procedure must be devised in this difficult situation because of the unknown arrival time and unknown amplitude of the impulse noise. A method of start-up learning in an adaptive canceler under these conditions is now described with reference to FIG. 7.

Figure 7:
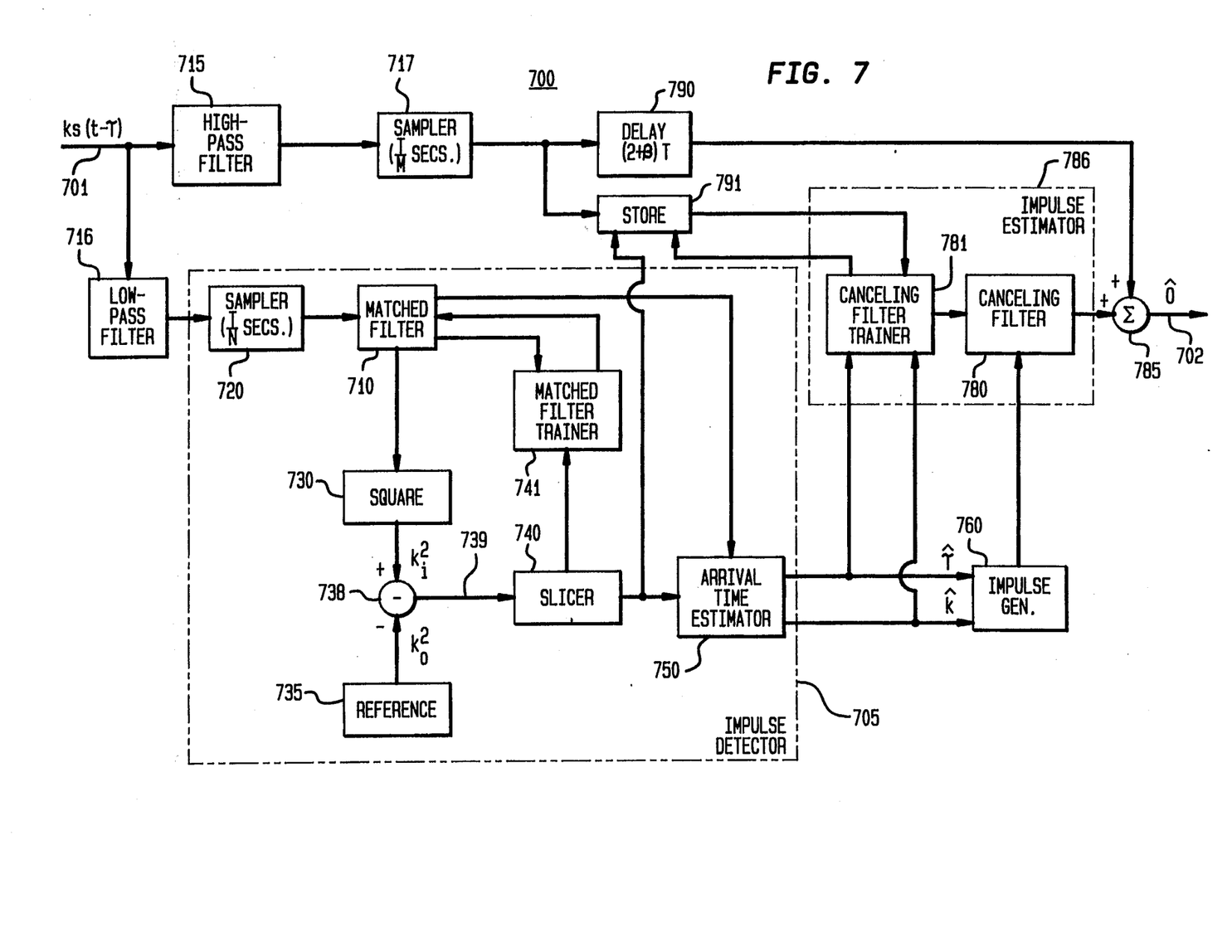
FIG. 7 depicts, in block diagram form, circuitry for canceling impulse noise given that the shape, magnitude and arrival time are all unknowns.

Impulse noise canceler 700 embodies the basic principles of the abovedescribed cancelers, but with the added capability of being adaptable to a wide variety of impulse shapes. One of the differences between FIGS. 6 and 7 is that there are samplers, namely, samplers 717 and 720, at the outputs of both high-pass filter 715 and low-pass filter 716 with different sampling rates, namely, M and N, respectively. The different sampling rates merely reflect different frequency of sampling requirements necessary to represent signals in different frequency bands. The illustrative embodiment is thus treated in the sample domain. Typically, both M and N are on the order of ten.

Before the first impulse arrives, matched filter 710, which is typically realized as a FIR filter in the sample domain, has its taps set to approximate an arbitrary impulse-like shape. The combination of elements 730, 735, 738, and 740 senses approximately when a pulse of sufficient energy to be a noise impulse arrives—this combination of elements is structured and operates in the same manner as described with reference to corresponding level detector elements of FIG. 4. A noise pulse occurs whenever a value of $k_i^2$ is greater than $k_0^2$, and such a level crossing activates matched filter trainer 741 and the store 791. This activation causes these devices to store data for T seconds in the past and prepares for the storage of data representing an interval of time equaling T seconds in the future relative to the index i on $k_i$. Trainer 741 stores samples from matched filter 710 and store 791 stores values from sampler 717. It is assumed that T is greater than the duration of the longest expected impulse.

Arrival time estimator 750 operates in a manner substantially the same as estimator 350 of FIG. 3. When the estimated arrival time is available, appropriate segments of length T in both store 791 and matched filter trainer 741 are selected. Then, matched filter 710 is adapted from data in trainer 741 according to a rule of the following type:

$$a'_{nL} = \alpha_1 a_{nL} + \alpha_2 S_L\left(\frac{nT}{N} - \tau\right) \tag{1}$$

where $a'_{nL}$ is the new value of the gain of the $n^{th}$ tap in the FIR matching filter, $a_{nL}$ is the old value of the tap gain, and $\alpha_1$ and $\alpha_2$ are numbers less than one. In order to guarantee that repeating values $$S\left(\frac{nT}{N} - \tau\right)$$

on a long succession of impulses should lead to constant values of $a_{nL}$ requires that $$\alpha_1 \alpha_2 = 1. \tag{2}$$

It should be noted that equation (1) indicates that the influence of the occurrence of one impulse decays exponentially with the number of successive impulses. Thus, rapid adaption is characterized by small values of $\alpha_1$ and slow adaptation by values of $\alpha_1$ that are close to one.

Training of canceling filter 781 based on data in store 791 proceeds according to an algorithm defined and adjusted in a manner substantially similar to that given in equation (1), that is:

$$b'_{nH} = \gamma_1 b_{nH} + \gamma_2 S_H\left(\frac{nT}{M} - \tau\right). \tag{3}$$

Again, the constants are subject to $$\gamma_1 = \gamma_2 = 1. \tag{4}$$

It also should be noted that $\alpha_1$ or $\gamma_1$ may be changed at any time. Thus, it might be advantageous to use large values of $\alpha_1$ or $\gamma_1$ initially to bring the canceler tap-gain profile reasonably close to what might be reality and then switch to a smaller value of $\alpha_1$ or $\gamma_1$ for finegrained adjustment of the tap weights. Furthermore, the values of $\alpha_1$ or $\gamma_1$ might be changed automatically in response to the rate at which the tap-weights change, the values of the tap weights, the performance of the canceler, or a number of other parameters. Thus, the approach that is illustrated in FIG. 7 provides a general framework for canceling impulses with shapes that are not known beforehand or shapes that are changing.

By way of notation, two combinations of elements are now defined for reference in the following section. The first combination, designated as impulse detector 705, is composed of the structure and interconnection exhibited by elements 710, 720, 730, 735,738,740, 741, and 750; this combination is shown by a dotted line encompassing the listed elements. The second combination, designated as impulse estimator 786, is composed of the structure and interconnection exhibited by elements 780 and 781; this combination is also shown by a dotted line encompassing the listed elements.

CANCELLATION OF ANY OF A VARIETY OF IMPULSE SHAPES

Figure 8:
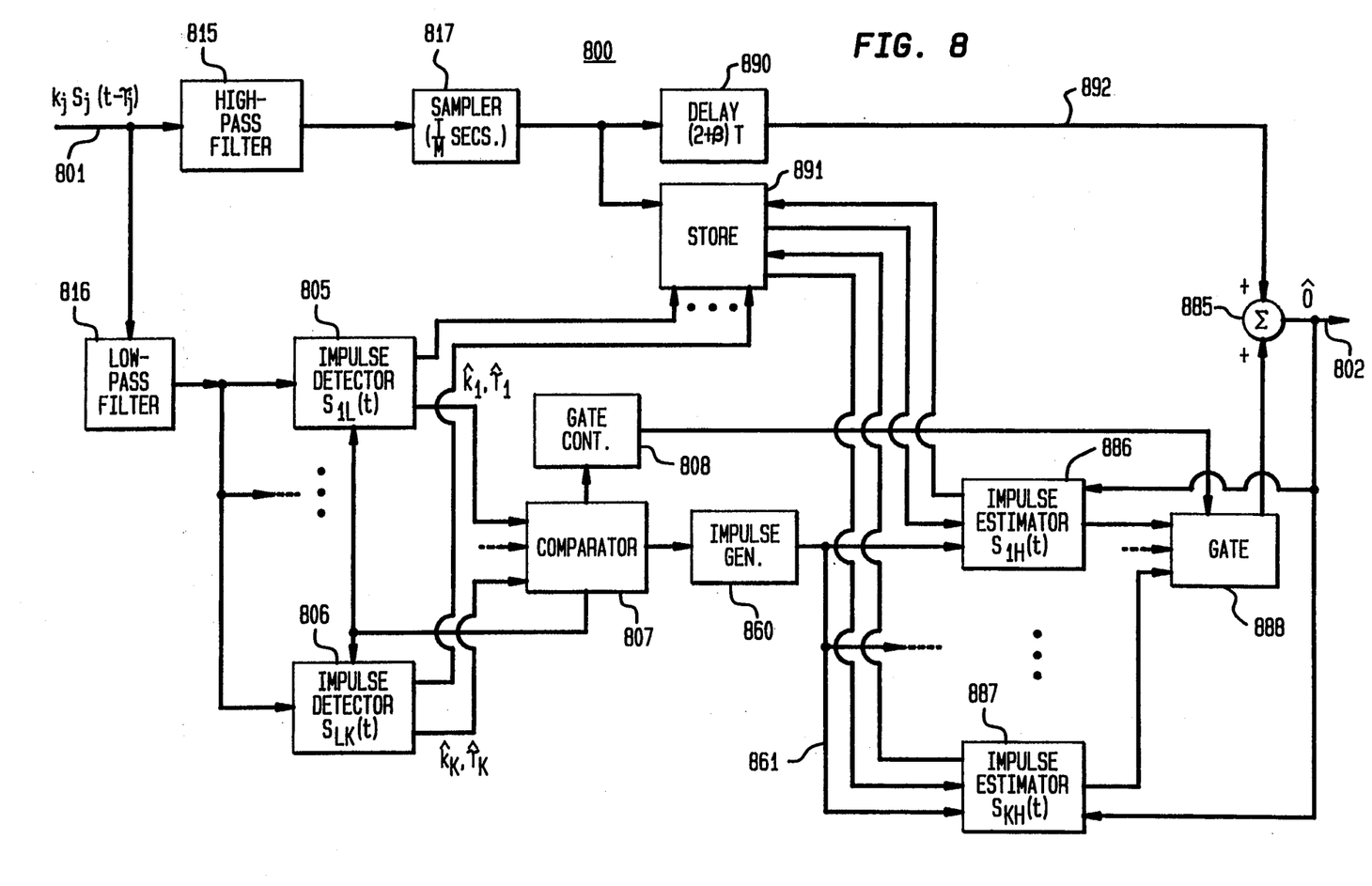
FIG. 8 depicts, in block diagram form, circuitry for canceling a plurality of impulse noises given that the shape, magnitude, and arrival time of each of the plurality of impulses are all unknown.

On many loops there will be more than one impulse shape that frequently appears. A network for canceling any of these shapes is shown as canceler 800 in FIG. 8. In FIG. 8, the upper branch of the diagram again includes high-pass filter 815 to filter the communication signal from the presumed spectrum of the impulse noise; accordingly, the input noise impulse shape $S_j(t-\tau_j)$ is converted into its high-pass component, $S_{jH}(t-\tau_j)$. The index "j" refers to which of the possible impulse shapes is arriving. Delay device 890 accounts for the delay of the lower branch, as before.

The lower branch of FIG. 8 includes low-pass filter 816 with output $S_{jL}(t-\tau_j)$ when the $j^{th}$ impulse shape, $S_j(t-\tau_j)$ arrives at time $\tau_j$. The output of low pass filter 816 drives a bank of K impulse detectors, including detectors 805 and 806 of the type described in the preceding section with reference to element 705. Each of these detectors includes a matched filter that is matched to the low-pass component of one of the possible arriving impulses. Each of these detectors also contains its own arrival time estimator which produces both $\hat{K}_j$ and $\hat{\tau}_j$. The estimated impulse amplitude and arrival time of each detector are fed into comparator 807 which then determines the impulse detector, say the $i^{th}$ detector, that produces the largest value of $\hat{K}_j$. Comparator 807 then drives impulse function generator 860, (a unit function generator in the sampled data processing domain), to produce a delta function at $\hat{\tau}_j$ with amplitude $-\hat{k}_j$ on lead 861. Comparator 807 also provides an input to gate controller 808 which, in turn, controls gate 888. Gate 888 connects the $i^{th}$ impulse estimator, denoted $S_{iH}(t)$, corresponding to the impulse detector producing the largest of $\hat{k}j$, to summer 885; gate 888 thereby connects the impulse estimator having the best approximation to the incoming shape to summer 885. The incoming shape appears on lead 892 which serves as a second input to summer 885. The output of canceler 800, which appears on lead 802, is denoted $\hat{0}$ to indicate that cancellation may not be exact due to the approximations engendered by canceler 800.

Store 891, which is responsive to each impulse detector 805, . . . ,806, stores samples for use by each trainer embedded within impulse estimators 886, . . . ,887. The operation of store 891 was described above with respect to FIG. 7; in one illustrative embodiment, store 891 may be configured as a multiple, parallel storage arrangement to account for the multiplicity of impulse detectors.

For training initialization, the impulse detectors can be set to any arbitrary collection of orthogonal functions that span the space of anticipated impulses. When this space is of greater dimensionality than the number of available shape detectors, dithering around the space might be necessary until the most prevalent impulse shapes are ascertained. This would frequently be the case if only one detector were used, but more than one impulse shape appeared on the line.

OTHER ENVIRONMENTS

Impulse canceler 800 illustrated in FIG. 8 may be used in systems wherein the high-pass filter 815 and low-pass filter 816 may be replaced by different filter shapes. The upper-branch filter should, however, generally suppress impulse noise as much as possible with minimal impairment of the information signals, while the lower branch signal should enhance the relative importance of the impulse. The optimal shapes of these filters will depend upon the system that the canceler is implemented on and the anticipated impulse shapes.

The general principles of FIG. 8 can be employed to produce a canceler for impulses that are linear combinations of a small number of characteristic shapes. To effect this, comparator 807 is replaced by a set of parallel impulse generators that drive a bank of FIRs followed by a summer. The basic principles of impulse detection and learning of basic shapes remain the same.

It is to be understood that the above-identified arrangements are simply illustrative of the application of the principles in accordance with the present invention. Other arrangements may be readily devised by those of ordinary skill in the art which embody the principles of the present invention and fall within its spirit and scope.

What is claimed is:

1. A canceler for processing an incoming signal corrupted with an incoming impulse noise having a shape, an arrival time, and an amplitude of which shape, arrival time, and amplitude at least said arrival time and amplitude are unknown, the canceler comprising
    matched filter means responsive to the incoming signal for determining over a time period that the incoming impulse noise matches the shape of a noise impulse,
    means responsive to said matched filter means for estimating the amplitude and arrival time of the impulse noise,
    means connected to said estimating means and responsive to said estimated amplitude and arrival time for generating a representation of the impulse noise shape and for weighting said representation with said estimated amplitude to provide a weighted replica of the impulse noise, and
    means responsive to the incoming signal and connected to said means for generating and weighting for substantially canceling the impulse noise in the incoming signal with said weighted replica.

2. A canceler in accordance with claim 1 wherein the shape of the impulse noise is also unknown and said means for generating and weighting further includes means for adaptively determining a representation of the impulse shape to provide said weighted replica.

3. A canceler in accordance with claim 1 further comprising delay means for delaying the incoming signal, said means for canceling being connected to the output of said delay means.

4. A canceler in accordance with claim 1 wherein said means for estimating maintains a recent history of the output of said matched filter means.

5. A canceler for processing an incoming signal corrupted with impulse noise having a known shape but unknown amplitude and unknown arrival time, the canceler comprising first processing circuitry including:
  a matched filter, responsive to the incoming signal, to provide a matched filter output signal, said matched filter being substantially matched to the known shape,
  a sampler, responsive to said matched filter output signal, for sampling said matched filter output signal at a predetermined sampling rate to produce a sampled signal,
  a level detector, responsive to said sampler, for producing a detected signal whenever the magnitude of said sampled signal exceeds a predetermined reference signal,
  an arrival time estimator, coupled to said sampler and said level detector, for generating an estimate to the arrival time and an estimate to the amplitude of the impulse noise,
  a impulse generator, responsive to said arrival time estimator, for producing a negative delta-function having a weight substantially equal to said estimated amplitude and a time of occurrence corresponding to said estimated arrival time,
  a canceling filter, coupled to said impulse generator, for producing a canceling output signal, said canceling filter having an impulse response substantially equal to the known shape;
  second processing circuitry including means for delaying the incoming signal to produce a delayed signal, said means for delaying having a delay substantially equal to the delay introduced by the processing of said first processing circuitry; and
  a summer, responsive to said canceling output signal and said delayed signal, for producing a canceler output signal in correspondence to the incoming signal wherein the impulse noise in the incoming signal is substantially attenuated.

6. The canceler as recited in claim 5 wherein the impulse noise shape has a known duration and said arrival time estimator includes
  means for detecting the maximum value of said sampled signal to produce said estimated amplitude,
  means for storing the time of occurrence of said estimated amplitude, and
  means for determining said estimated arrival time from said time of occurrence of said estimated amplitude and the known duration of the impulse noise shape.

7. The canceler as recited in claim 6 wherein the incoming signal includes the desired signal and the impulse noise,
  said first processing circuitry includes a low-pass filter interposed before said matched filter, said low-pass filter arranged to attenuate the desired signal, said matched filter being matched to the impulse noise shape at the output of said low-pass filter; and
  said second processing circuitry includes a high-pass filter interposed before said means for delaying, said high-pass filter arranged to attenuate the impulse noise shape, said canceling filter having an impulse response substantially equal to the impulse noise shape at the output of said high-pass filter.

8. A canceler for processing an incoming signal corrupted with impulse noise having an unknown shape, an unknown amplitude and unknown arrival time, the canceler comprising
  processing means, responsive to said incoming signal, for adapting to the shape of the impulse noise to produce a matched output signal and a detected signal indicative of said matched output signal exceeding a predetermined threshold,
  means, coupled to said processing means, for estimating both the amplitude and the arrival time of the impulse noise from said matched output signal and said detected signal to produce both an estimated amplitude and an estimated arrival time,
  means, responsive to the incoming signal, for attenuating the impulse noise to produce a filtered incoming signal,
  means, coupled to said means for estimating and responsive to said filtered incoming signal and said detected signal, for adaptively determining a replica of the impulse shape using said estimated arrival time and said estimated amplitude to provide a weighted replica, and
  means, coupled to said means for determining and responsive to said filtered incoming signal, for substantially canceling the impulse noise in the incoming signal with said weighted replica.

9. A canceler for processing an incoming signal including a desired signal corrupted with impulse noise having an unknown shape, an unknown amplitude, and an unknown arrival time, the canceler comprising
  first processing circuitry including:
    a low-pass filter, responsive to the incoming signal, for producing a low-pass filtered signal, said low-pass filter having a characteristic to attenuate the desired signal and pass the impulse noise,
    a first sampler, responsive to said low-pass filter, for sampling said low-pass filtered signal at a first predetermined sampling rate to produce a first sampled signal,
    an adaptive matched filter, coupled to said first sampler, to provide a matched filter output signal,
    a level detector, responsive to said adaptive matched filter, for producing a detected signal whenever the magnitude of said matched filter output signal exceeds a predetermined reference signal,
    a matched filter trainer, coupled to said adaptive matched filter and responsive to said detected signal, for training said adaptive matched filter to converge to a filter characteristic matched to the unknown shape,
    an arrival time estimator, coupled to said adaptive matched filter and said level detector, for generating an estimate to the arrival time and an estimate to the amplitude of the impulse noise shape,
    an impulse generator, responsive to said arrival time estimator, for producing a negative delta-function having a weight substantially equal to said estimated amplitude and a time of occurrence corresponding to said estimated arrival time,
    a canceling filter trainer coupled to said arrival time estimator,
    a canceling filter, coupled to said impulse generator and said canceling filter,
  second processing circuitry including
    a high-pass filter, responsive to the incoming signal, for producing a high-pass filtered signal, said high-pass filter having a characteristic to attenuate the impulse noise and pass the desired signal, a second sampler, responsive to said high-pass filter, for sampling said high-pass filtered signal at a second predetermined sampling rate to generate a second sampled signal, means for delaying said second sampled signal to produce a delayed signal, said means for delaying having a delay substantially equal to the delay introduced by the processing of said first processing circuitry;

a storage device, responsive to said level detector, to said second sampled signal, and to said canceling filter trainer, for storing samples from said second sampled signal in response to said detected signal, a summer, responsive to said canceling filter signal and said delayed signal, for producing an canceler output signal in correspondence to the incoming signal wherein the impulse noise in the incoming signal is substantially attenuated, said canceling filter trainer being coupled to said storage device and said canceling filter is further responsive to said canceler output signal so as to train said canceling filter to converge to the impulse noise shape.

10. A canceler for processing an incoming signal sequentially corrupted with one of a plurality of impulse noises each having an unknown shape, an unknown amplitude and an unknown arrival time, the canceler comprising processing means, responsive to said incoming signal, for adapting to each shape of each of the impulse noises to produce a plurality of a matched output signals in one-to-one correspondence to the plurality of impulse noises, and to produce a plurality of detected signals indicative of each of said matched outputs signal exceeding a corresponding predetermined threshold, means, coupled to said processing means, for estimating the amplitude of each of the plurality of impulse noises and for estimating the arrival time of each of the plurality of impulse noises from said corresponding plurality of said matched output signals and said corresponding plurality of detected signals to produce both an estimated amplitude and an estimated arrival time for each of the impulse noises, means, responsive to the incoming signal, for attenuating the impulse noises to produce a filtered incoming signal, means, coupled to said means for estimating and responsive to said filtered incoming signal and each of said detected signals, for adaptively determining a replica of each one of the impulse noises using each said estimated arrival time and each said estimated amplitude to provide a plurality of weighted replicas, and means, coupled to said means for determining and responsive to said filtered incoming signal, for substantially canceling said one of the impulse noises in the incoming signal with the one of said weighted replicas corresponding to the maximum of said detected signals.

11. A canceler for processing an incoming signal including a desired signal sequentially corrupted with one of a plurality of impulse noises each having an unknown shape, an unknown amplitude, and an unknown arrival time, the canceler comprising first processing circuitry including:

a low-pass filter, responsive to the incoming signal, for producing a low-pass filtered signal, said low-pass filter having a characteristic to attenuate the desired signal and pass the impulse noises, a plurality of impulse detectors, each of said detectors including a first sampler, responsive to said low-pass filter, for sampling said low-pass filtered signal at a first predetermined sampling rate to produce a first sampled signal, an adaptive matched filter, coupled to said first sampler, to provide a matched filter output signal, a level detector, responsive to said adaptive matched filter, for producing a detected signal whenever the magnitude of said matched filter output signal exceeds a predetermined reference signal, a matched filter trainer, coupled to said adaptive matched filter and responsive to said detected signal, for training said adaptive matched filter to converge to a filter characteristic matched to the unknown shape, an arrival time estimator, coupled to said adaptive matched filter and said level detector, for generating an estimate to the arrival time and an estimate to the amplitude of the impulse noise shape, said impulse detectors thereby producing a plurality of detected signals and estimated amplitudes and estimated arrival times, a comparator, responsive to said plurality of impulse detectors, for selecting one of said estimated amplitudes and one of said estimated arrival times in correspondence to the maximum of said detected signals, an impulse generator, responsive to said comparator, for producing a negative delta-function having a weight substantially equal to said selected estimated amplitude and a time of occurrence corresponding to said selected estimated arrival time, a plurality of impulse estimators, each of said estimators including a canceling filter trainer, a canceling filter, coupled to said impulse generator and said canceling filter, second processing circuitry including a high-pass filter, responsive to the incoming signal, for producing a high-pass filtered signal, said high-pass filter having a characteristic to attenuate the impulse noises and pass the desired signal, a second sampler, responsive to said high-pass filter, for sampling said high-pass filtered signal at a second predetermined sampling rate to generate a second sampled signal, means for delaying said second sampled signal to produce a delayed signal, said means for delaying having a delay substantially equal to the delay introduced by the processing of said first processing circuitry;

a storage device, responsive to said detected signals, to said second sampled signal, and to each said canceling filter trainer in each said plurality of impulse estimators, for storing samples from said second sampled signal in response to said detected signals, a controller, responsive to said detected signals, for selecting one of said impulse estimators in correspondence to said maximum detected signal, a summer, responsive to said selected one of said impulse estimators, for producing an canceler output signal in correspondence to the incoming signal wherein the incoming one of the plurality of impulse noises in the incoming signal is substantially attenuated, said impulse estimators being coupled to said storage device so as to train said impulse estimators to converge to corresponding ones of the impulse noise shapes.

* * * * *